United States Patent [19]
Dammann et al.

[11] Patent Number: 4,748,614
[45] Date of Patent: May 31, 1988

[54] OPTICAL WAVELENGTH-MULTIPLEXING AND/OR DEMULTIPLEXING DEVICE

[75] Inventors: Hans Dammann, Tangstedt; Ulrich Killat, Hamburg; Gert Rabe, Pinneberg, all of Fed. Rep. of Germany

[73] Assignee: U.S. Philips Corporation, New York, N.Y.

[21] Appl. No.: 483,470

[22] Filed: Apr. 11, 1983

[30] Foreign Application Priority Data

Apr. 15, 1982 [DE] Fed. Rep. of Germany ....... 3213839

[51] Int. Cl.$^4$ .............................................. H04B 9/00
[52] U.S. Cl. .................................... 370/3; 350/96.19; 370/1
[58] Field of Search ..................... 370/3, 1; 350/96.16, 350/96.19, 96.15

[56] References Cited

U.S. PATENT DOCUMENTS

| | | | |
|---|---|---|---|
| 4,111,524 | 9/1978 | Tomlinson, III | 350/96.19 |
| 4,198,117 | 4/1980 | Kobayashi | 370/3 |
| 4,362,359 | 12/1982 | Dammann et al. | 370/3 |
| 4,449,782 | 5/1984 | Korth | 370/3 |

FOREIGN PATENT DOCUMENTS 40706 12/1981 European Pat. Off. ......... 350/96.19

OTHER PUBLICATIONS

Fujii et al., "Optical Demultiplexer"-IEEE Jour. of Quantum Elec., vol. QE-16, No. 2, Feb. 1980, pp. 165-167.
Miki et al., "A Design Concept on Fiber-Optic WDM"-Ntg Fachber (Germany), vol. 73, 1980, pp. 41-45.
Kobayashi et al., "Microoptic Grating Multiplexers'-'-IEEE Jour. of Quantum Elec., vol. QE 16, No. 1, Jan. 1980, pp. 11-22.
Nicia, A. "Wavelength Multiplexing and Demultiplexing Systems for Singlemode and Multimode Filbers." 7th Euro. conf. on Opt. Comm. Copenhagen (Sep. 1981).
Yen, H. W. "Planar Rowland Spectrometer for Fiber-optic Wavelength Demultiplying" *Optics Letters,* vol. 6, No. 12, pp. 639-641 (Dec. 1981).
Dammann, H. "Optische Gitter-moderne Anwendungen" *Physik in Unserer Zeit,* vol. 11, No. 3, pp. 83-91 (May, 1980).

*Primary Examiner*—Robert L. Griffin
*Assistant Examiner*—Andrea J. Telesz, Jr.
*Attorney, Agent, or Firm*—Thomas A. Briody; Jack E. Haken

[57] ABSTRACT

The invention relates to an optical wavelength multiplexing and/or demultiplexing device. The device comprises a digital phase grating having at least four steps. The grating diffracts light of at least three different wavelengths in different central diffraction orders. Since the grating period may be high in comparison with the wavelengths light-emitting diodes may be used as light sources.

8 Claims, 1 Drawing Sheet

OPTICAL WAVELENGTH-MULTIPLEXING AND/OR DEMULTIPLEXING DEVICE

BACKGROUND OF THE INVENTION

The invention relates to an optical wavelength multiplexing and/or demultiplexing device. The device has a first light guide and at least three further light guides and a phase grating. The grating is arranged in the radiation path between the first light guide and the further light guides.

Such a device is known, for example, an article by H. W. Yen entitled "Planar Rowland spectrometer for fiber-optic wavelength demultiplexing" (Optics Letters, December 1981, Vol. 6, No. 12, pages 639–641). The phase grating splits the polychromatic light by dispersion in a single diffraction order, generally the first order. In order to obtain a sufficiently large difference between the diffraction angles of the various wavelengths which are situated comparatively close to each other (20 to 40 nm) grating period must be comparatively small. Therefore, the manufacture of such phase gratings is very intricate. As Only lasers may be used as the light sources in the known device. Light emitting diodes, which emit light in a range of approximately 20 nm around a central wavelength, are not suitable. Because of the strong dispersion of the known demultiplexer, light from a diode would be emitted in such a wide angular range that a substantial part of the light would not reach the light guide (a glass fiber) intended to carry this wavelength.

SUMMARY OF THE INVENTION

It is an object of the present invention to provide a multiplexing and/or demultiplexing device such that a phase grating having a substantially higher grating period can be used.

In the device according to the invention, the phase grating is a digital phase grating comprising at least four steps. The grating period is a multiple of the wavelength of the radiation to be transmitted. The parameters of the phase grating, such as step height and number of steps per grating period, are such that the light of each of the wavelengths is diffracted mainly in one of the central diffraction orders so that the different wavelengths correspond to different diffraction orders.

Herein "digital phase grating" is to be understood to mean a grating whose profile changes stepwise within one grating period. Such gratings are known, (for example, from the article entitled "Optische Gitter-moderne Anwendungen by H. Dammann (Physik in unserer Zeit, Vol. 11, No. 3, May 1980, pages 83–91).

According to the invention, light of different wavelengths is separated into various central diffraction orders. In the known device, as stated above, separation is obtained by dispersion within one diffraction order. In the device according to the invention, the dispersion will be very small compared to the known device. Alternatively, the grating period can be comparatively large (15,000 nm or more) with the same dispersion.

The small dispersion of the device according to the invention enables light-emitting diodes to be used as light sources instead of lasers. A further advantage is that the wavelengths chosen may differ substantially from each other. In the known devices, however, the wavelengths must be equally spaced and must be situated comparatively close to each other.

In a preferred embodiment of the invention the digital phase grating is a reflection grating, i.e. its surfaces are reflecting. In principle, the invention may employ a digital transmission phase-grating, but a reflection grating has several advantages. These are:

(a) the light guide which guides light of combined wavelengths may be arranged on the same side of the phase grating as the light guides which each guide light of one wavelength;

(b) if the reflection phase-grating is planar, a single lens may be used for focussing, while a transmission grating generally requires the use of two lenses;

(c) the reflection grating may be curved in such a way that focussing is obtained by the curvature so that no lenses at all need be used; and (d) the step height in a reflection phase-grating is a factor $(n-1)/2$ smaller than in the case of a transmission grating (where n=refractive index of the transmission grating). This greatly simplifies the manufacture of the reflection grating.

In a further embodiment of the invention the height of one step is a multiple of the wavelength of the radiation to be transmitted. The wavelengths in a device according to the invention may be closer to each other as the step height is increased in comparison with the wavelengths used. Increasing the number of steps has a similar effect, but also improves the diffraction efficiency of the central diffraction orders.

In another embodiment of the invention, in at least one of the diffraction orders light of two substantially different wavelengths is diffracted and there is provided one light guide for each of the two wavelengths. This embodiment allows for the fact that in the case of a digital phase grating for a given diffraction order there are a plurality of comparatively widely spaced wavelengths for which most of the light is radiated in the diffraction order. As a result of their comparatively large difference, the wavelengths within a diffraction order can be separated by angular dispersion on the phase grating despite the large grating constant.

A more effective use of the digital phase grating is obtained if, in a further embodiment of the invention the phase grating is used both in a multiplexer and in a demultiplexer.

DESCRIPTION OF THE PREFERRED EMBODIMENTS

Figure 1A:
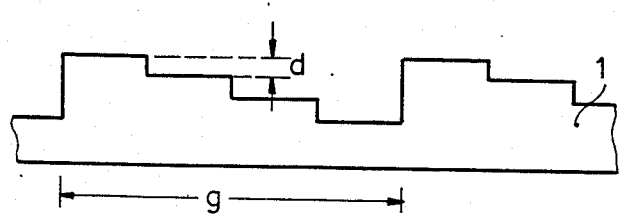
FIG. 1a schematically shows the profile of a first embodiment of a digital phase grating according to the invention.

FIG. 1a shows a digital phase grating 1 comprising four steps per grating period g. The height of the steps is designated d, and the surfaces of the steps extend perpendicular to the plane of the drawing and either perpendicular or parallel to the grating plane. The grating is provided with a reflecting coating on its upper side. Such a regular digital reflection phase-grating diffracts light of the wavelength $l_q$ in the $q^{th}$ diffraction order if the relationship $$l_q = 2d/(2k + q/P) \quad (1)$$

is met. In this equation, d is the step height, q the number of the diffraction order (positive for positive diffraction orders and negative for negative diffraction orders and zero for the zero diffraction order), k is either a positive integer or zero (zero only if q differs from zero), and P is the number of steps per grating period.

The diffraction efficiency $a_q$ is then $$a_q = \{P \sin(\pi q/P)/\pi q\}^2 \quad (2)$$

It has been found that the diffraction efficiency for the central diffraction orders (q = +1, 0 or −1) is particularly high, and that the efficiencies for the non-zero diffraction orders increase as the number of steps, P, per grating period increases.

The diffraction angle $\beta$ is then $$\beta = q \cdot l_q / g. \quad (3)$$

$\beta$ being expressed in degrees of arc and g being the grating period. The diffraction angle is the angle of the relevant diffraction direction to the normal to the grating plane or the steps. If $\beta = 0$ (zeroth diffraction order) the direction of diffraction in FIG. 1a (in the case of light incident perpendicularly) extends perpendicularly upwards. If $\beta \geq 0$ the light is diffracted to the top right and for $\beta < 0$ a diffraction to the top left is obtained.

A practical embodiment of the reflection phase-grating shown in FIG. 1a has a grating period g = 25,000 nm and a step height d = 1600 nm. Equation (1) then yields the wavelength $l_{+1} = 753$ nm for the +1st diffraction order, the wavelength $l_0 = 800$ nm for the zeroth diffraction order and the wavelength $l_{-1} = 853$ nm for the −1st diffraction order.

The efficiency for the +1st and the −1st diffraction orders is approximately 81%, as calculated using equation (2). The efficiency for the zeroth diffraction order is 100%, so that light of wavelength $l_0$ will not appear in +1st or the −1st diffraction order. Moreover, the theory (cf. Dammann, Physik in unserer Zeit, supra at page 88) shows that light of the wavelength $l_{+1}$ cannot appear in the −1st diffraction order and in the zeroth diffraction order, and that light of the wavelength $l_{-1}$ cannot appear in the +1st diffraction order and in the zeroth diffraction order. It also follows from theory that these conclusions also apply to narrow spectral bands around the specified wavelengths.

Figure 1B:
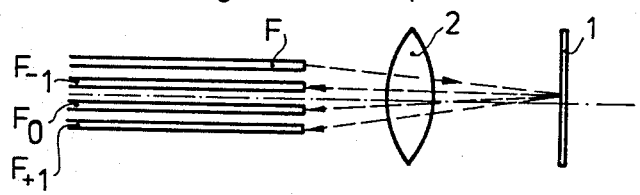
FIG. 1b schematically shows a demultiplexer employing such a phase grating.

FIG. 1b shows an optical wavelength demultiplexer which employs the phase grating described with reference to FIG. 1a for separating the various wavelengths. The grating direction extends perpendicular to the plane of the drawing. The step height decreases from top to bottom within the grating period shown in FIG. 1a.

Light of the wavelengths $l_{+1}$, $l_0$ and $l_{-1}$ which emanates from a fiber F is incident on the grating 1. Fiber F and three other fibers $F_{-1}$, $F_0$, $F_{+1}$ (component light guides) are disposed in one plane as shown in FIG. 1b.

A lens 2 is arranged at a distance from the end faces of the fibers, which distance is equal to its focal length f. The lens 2 converts the diverging light from the fiber F into a parallel light beam which is incident on the reflection phase-grating 1. This grating reflects the diffracted parallel light beams back to the lens which converges the light. The focal plane of lens 2 coincides with the plane of the end faces of the glass fibers $F_{-1}$, $F_0$ and $F_{+1}$.

The grating 1 is arranged so that in its zeroth diffraction order, for which the grating acts as a mirror, the light from the fiber F is coupled into the glass fiber $F_0$. This can be achieved by arranging the grating not exactly perpendicular to the optical axis, but tilted through a small angle about an axis which is perpendicular to the plane of drawing of FIG. 1b.

FIG. 1b shows one ray which emerges from the end face of the fiber F. After reflection from the grating (slightly off the optical axis), the ray is diverted into the fiber $F_0$. In reality, a diverging beam emerges from F, which beam illuminates a comparatively large part of the grating area, from which it is reflected back to the lens 2.

The light of the wavelength $l_{-1}$ which issues from the fiber F is deviated upward through a small angle $\beta_{-1}$ (cf. equation (3)) by the grating 1. This beam is focussed by the lens 2 and is coupled into the fiber $F_{-1}$, which is situated between the fiber F and the fiber $F_0$. The light of the wavelength $l_{+1}$ from fiber F is deviated downward through the angle $\beta_{+1}$ and coupled into the fiber $F_{+1}$.

Figure 1C:
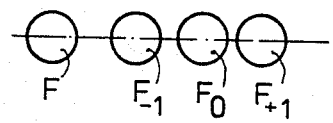
FIG. 1c schematically shows the arrangement of the light guides in this demultiplexer in a plane which is perpendicular to the light guides.

The positions of the individual fibers are shown in FIG. 1c. The spacing of the fibers $F_{-1}$ and $F_{+1}$ from the fibre $F_0$ (which is the spacing between the central axis of these fibers) is determined by the product of the focal length f of the lens 2 and the diffraction angle $\beta_{-1}$ or $\beta_{+1}$ according to the equation (3). For the specified values of f, P and d, the distances will be 0.17 mm and 0.15 mm respectively.

In the manner described above, the device shown in FIG. 1b operates as a demultiplexer. It may be used as a multiplexer if the optical paths are reversed. Light of the wavelength $l_{-1}$ from the fiber $F_{-1}$, light of the wavelength $l_0$ from the fiber $F_0$, and light of the wavelength $l_{+1}$ from the fiber $F_{+1}$ is then coupled into the fiber $F_0$. When a second set of fibers is used the grating 1 and the lens 2 may also be used as part of a combination of a multiplexer and a demultiplexer which are operated independently of each other.

Figure 2A:
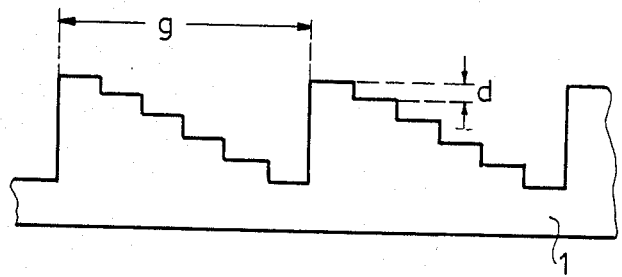
FIG. 2a schematically shows a second embodiment of a phase grating according to the invention.

FIGS. 2a shows a digital reflection phase-grating comprising six steps per grating period. The grating period g is 48,000 nm and the step height d is 4,000 nm. The demultiplexer shown in FIGS. 2b and 2c, which is constructed by means of this phase grating, differs from the demultiplexer shown in FIGS. 1b and 1c One difference is in that the fiber F transmits light of five different wavelengths, which is divided among five fibers 3 ... 7. Moreover, the fiber F of FIGS. 2b and 2c, as distinct from that in FIG. 1b and 1c, is not arranged in the same plane as the fibers 3 ... 7 which transmit monochromatic light. The fiber F is arranged above the central fiber 5 in such a way that the plane through the central axes of fibers F and 5 extends perpendicular to the plane defined by the central axes of the fibers 3 . . . 7.

The fiber F transmits light of the wavelengths 787 nm, 800 nm, 813 nm, 1297 nm and 1371 nm.

The light of the wavelength 800 nm propagates in the 0th diffraction order and is coupled into the fiber 5 via the lens 2. In order to achieve this the grating 1 is inclined slightly relative to an axis which is disposed in the plane of the drawing and which is perpendicular to the optical axis 0. The grating 1 which acts as a mirror for this diffraction order. It follows from equation (1) that it is also possible to transmit light of the wavelength 1333 nm in the 0th diffraction order.

The light of the wavelength 787 nm from the fiber F is diffracted in the +1st diffraction order and coupled into the fiber 6. Fiber 0 is situated at a distance of 0.23 mm from the fiber 5 (if the lens 2 has a focal length of 14 mm).

In addition to the light of the wavelength 787 nm the light of the wavelength 1297 nm is also diffracted in the 1st diffraction order, as can be demonstrated by equation (1), if k=3 instead of k=5. The wavelengths in the +1st diffraction order are spaced so far apart that in spite of its high grating period of 48,000 nm the dispersion of the grating is sufficient to separate the two wavelengths spatially from each other. Thus, the light of the wavelength of 1297 nm is coupled into the fiber 7 which is situated at a distance of 0.378 mm from the fiber 5.

The wavelengths 813 nm and 1371 nm are both diffracted in the −1st diffraction order. The light of the wavelength 813 nm is coupled into the fiber 4, which is spaced 0.237 nm from the fiber 5. The light of the wavelength 1371 nm is coupled into the fiber 3 which is spaced approximately 400 nm from the fiber 5.

Figure 2B:
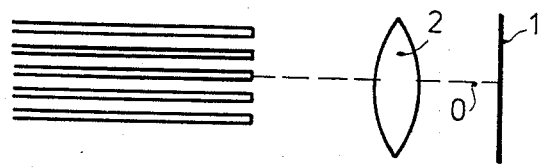
FIG. 2b schematically shows a demultiplexer employing such a grating.

By means of the phase grating shown in FIG. 2b, it is in principle possible to separate wavelengths in the 2nd diffraction order. However, the diffraction efficiency (approximately 68% is then substantially smaller than in the 1st diffraction order (approximately 91%).

The wavelengths in a range around 800 nm are substantially closer to each other than in the multiplexer described with reference to FIGS. 1a to 1c. This is caused by the greater number of steps and the greater step height. Such small differences in wavelengths (13 nm in the case of two adjacent fibers) cannot be processed by means of the known demultiplexers.

Figure 2C:
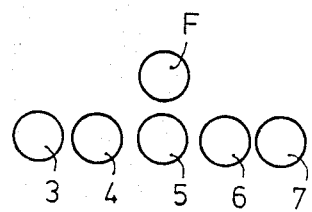
FIG. 2c schematically shows the arrangement of the light guides in this demultiplexer in a plane perpendicular to the light guides.

On the other hand, the demultiplexer shown in FIGS. 2a to 2c processes wavelengths which are situated in the range around 800 nm and in the range around 1300 nm. This may be advantageous in various cases because these wavelength ranges are of practical interest. Light sources (laser diodes or light-emitting diodes) are available for these wavelengths, and the attenuation in the fibers is very low for these wavelengths. Multiple, wavelengths, some of which are close to each other and others which are far from each other cannot be processed with known demultiplexers. For known demultiplexers the wavelength differences must be substantially constant.

A further advantage of the demultiplexer according to the invention is that as a result of the comparatively high grating constant their operation is not adversely affected by polarization effects, in contrast to the known demultiplexers which are so affected.

The digital phase gratings in the multiplexers and/or demultiplexers according to the invention need not be regular as the gratings shown in FIGS. 1a and 2a. Within a grating period they may comprise steps of different height and/or width. The exactly rectangular shape of the steps shown in the drawing cannot be achieved in practice, so that the profile of digital phase gratings which can be manufactured in practice differs slightly from this ideal shape. However, this does not affect the operation of the demultiplexers and/or multiplexers constructed by means of such gratings.

If the reflection grating is curved (concave) the lens 2 may be dispensed with.

What is claimed is:

1. An optical wavelength multiplexing/demultiplexing device for combining a number of light beams of different component wavelengths into a single light beam, or for separating a single light beam of many component wavelengths into a number of separate light beams of different component wavelengths, said device comprising:

a first light guide for transmitting a single light beam of many component wavelengths;

at least three component light guides, each for transmitting a single light beam of a component wavelength; and a phase grating arranged between the first light guide and the component light guides;

characterized in that:

the phase grating is a digital phase grating having at least four steps of different heights;

the phase grating has a period which is a multiple of each component wavelength; and the grating parameters are chosen so that each component wavelength is diffracted into a single central diffraction order which differs from that of the other component wavelengths.

2. A device as claimed in claim 1, characterized in that the grating parameters are the step height and the number of steps per grating period.

3. A device as claimed in claim 2, characterized in that the grating is a reflection grating.

4. A device as claimed in claim 3, characterized in that the step height is a multiple of each component wavelength.

5. An optical wavelength multiplexing/demultiplexing device for combining a number of light beams of different component wavelengths into a single light beam, or for separating a single light beam of many component wavelengths into a number of separate light beams of different component wavelengths, said device comprising:

a first light guide for transmitting a single light beam of many component wavelengths;

at least three component light guides, each for transmitting a single light beam of a component wavelength; and a phase grating arranged between the first light guide and the component light guides;

characterized in that:

the phase grating is a digital phase grating having at least four steps of different heights;

the phase grating has a period which is a multiple of each component wavelength; and the grating parameters are chosen so that each component wavelength is diffracted into one of at least two central diffraction orders, at least two of the component wavelengths being diffracted into the same diffraction order.

6. A device as claimed in claim 5, characterized in that the grating parameters are the step height and the number of steps per grating period.

7. A device as claimed in claim 6, characterized in that the grating is a reflection grating.

8. A device as claimed in claim 7, characterized in that the step height is a multiple of each component wavelength.

* * * * *